(12) United States Patent
Maruyama et al.

(10) Patent No.: US 9,030,692 B2
(45) Date of Patent: May 12, 2015

(54) IMAGE PROCESSING APPARATUS

(75) Inventors: Miyoko Maruyama, Osaka (JP); Naohiro Andoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 55 days.

(21) Appl. No.: 13/602,563

(22) Filed: Sep. 4, 2012

(65) Prior Publication Data
US 2013/0070295 A1 Mar. 21, 2013

(30) Foreign Application Priority Data

Sep. 15, 2011 (JP) ................. 2011-201670

(51) Int. Cl.
*G06F 3/12* (2006.01)
*H04N 1/00* (2006.01)
*G06F 15/00* (2006.01)

(52) U.S. Cl.
CPC .............. *H04N 1/00* (2013.01); *H04N 1/00389* (2013.01)

(58) Field of Classification Search
CPC .......... H04N 1/00389; H04N 1/32058; H04N 2201/0094; H04N 1/32048
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| 2002/0067514 | A1 | 6/2002 | Izumi et al. | |
| 2002/0128047 | A1* | 9/2002 | Gates | 455/566 |
| 2004/0165220 | A1* | 8/2004 | Fukuda | 358/400 |
| 2007/0115976 | A1 | 5/2007 | Yoshioka | |
| 2010/0033760 | A1 | 2/2010 | Kimura | |

FOREIGN PATENT DOCUMENTS

| CN | 101645999 A | 2/2010 |
| JP | 11-150614 A | 6/1999 |
| JP | 2001-197319 | 7/2001 |
| JP | 2001-218012 A | 8/2001 |
| JP | 2002-125088 A | 4/2002 |
| JP | 2003-152945 A | 5/2003 |
| JP | 2005-101796 A | 4/2005 |
| JP | 2007-123999 | 5/2007 |
| JP | 2008-259143 A | 10/2008 |

* cited by examiner

*Primary Examiner* — Thierry L Pham
(74) *Attorney, Agent, or Firm* — Renner, Otto, Boisselle & Sklar, LLP

(57) ABSTRACT

An image processing apparatus includes: an HDD for storing a plurality of pieces of transmission destination information in correspondence with a short-cut key for instructing image transmission; an operation unit displaying the short-cut key and detecting selection of the short-cut key; and a control unit displaying the plurality of transmission destinations stored in correspondence with the short-cut key if a prescribed condition is satisfied. The operation unit receives a selection operation of selecting a piece of transmission destination information from among the displayed plurality of pieces of transmission destination information, and the control unit determines the selected piece of transmission destination information to be the transmission destination of image transmission made by the selection of the short-cut key. Even if a plurality of transmission destinations are registered with the short-cut key, erroneous transmission to an unintended destination can be prevented.

2 Claims, 15 Drawing Sheets

IMAGE PROCESSING APPARATUS

CROSS-REFERENCE TO RELATED APPLICATION

This nonprovisional application claims priority under 35 U.S.C. §119(a) on Patent Application No. 2011-201670 filed in Japan on Sep. 15, 2011, the entire contents of which are hereby incorporated by reference.

BACKGROUND OF THE INVENTION

1. Field of the Invention

The present invention relates to an image processing apparatus having a function of transmitting image data such as facsimile and electronic mails and, more specifically, to an image processing apparatus capable of multicasting, by registering information of a plurality of transmission destinations with a short-cut key.

2. Description of the Background Art

As a method of sending documents such as forms and estimate sheets to a recipient, facsimile (hereinafter also referred to as FAX) has been widely used. Recently, it has become common to attach electronic data of such a document to an electronic mail and to send to a recipient through a network. It has become possible to select the method of transmission in accordance with the device (personal facsimile, multifunctional peripheral, or a personal computer (hereinafter referred to as a PC) used by the recipient.

By way of example, as one type of image processing apparatus, a multi function peripheral (MFP) having a plurality of functions including copying, printing, facsimile and scanning has come to be widely used. An MFP is capable of forming an image on a sheet of recording paper based on digital data of a document read by the scanning function or digital data received through a transmission line and, in addition, capable of image processing of such digital data to transmit by facsimile or electronic mail.

The method of transmission using an MFP includes a so-called multicasting, by which one document is sent to a plurality of recipients. For multicasting, the user sets the document to be transmitted on the MFP, successively sets a plurality of recipients of transmission, and presses a button for executing transmission, such as a start key. The set document is read and subjected to image conversion (converted to a facsimile data or to data to be attached to an electronic mail), and then, transmission to the set plurality of recipients of transmission takes place successively.

The following method has been known as a method of designating a recipient to whom a document is to be transmitted. For facsimile transmission, a facsimile number of the transmission destination is entered using ten-keys. For electronic mail transmission, electronic mail address (also simply referred to as mail address) of the transmission destination is entered using a keyboard (alphabetical keys). Here, an inputting error may possibly leads to a wrong transmission.

A technique of registering facsimile numbers and mail addresses of recipients of transmission in correspondence with recipient names in an address book (storing in a non-volatile memory or the like of the MFP) in order to prevent wrong transmission has been known. At the time of transmission, the user operates an operation unit of MFP to call the address book, and selects a recipient of transmission from the address book. A technique of registering a facsimile number or a mail address of a recipient of transmission with a key referred to as a "single-touch key" for higher operability has also been known. Simply by pressing the single-touch key, a call is made to the registered facsimile number and the document is transmitted. If an electronic mail address is registered with the single-touch key, the document is transmitted to the mail address.

A technique of registering a plurality of recipients of transmission in advance with a key referred to as a "group key" to make it easier to set multicast destinations has been known. When multicast transmission is desired, by simply pressing the group key, the registered recipients of transmission are set as the recipients of multicast transmission, and the document transmission can be executed.

In relation to the registration with the group key, other than directly registering the information of transmission destination (facsimile number or mail address), information specifying an already registered single-touch dial or abbreviated dial (single-touch number or abbreviated number) is often registered with the group key, as disclosed in Japanese Patent Laying-Open Nos. 11-150614 (hereinafter referred to as '614 Reference) and 2001-218012 (hereinafter referred to as '012 Reference). When the group key is pressed, the transmission destination information (facsimile number or mail address) is determined referring to the information of already registered single-touch dial or the abbreviation dial specified by the single-touch number or the abbreviated number registered with the group key. Thus, not only the transmission using group key but also individual transmission (single-touch dial or abbreviated dial) is possible, and an environment enabling document transmission in accordance with the situation and the user's intention is provided.

Since individuals having a plurality of terminals are increasing, it becomes a common practice to register a plurality of pieces of transmission destination information (facsimile number and mail address) for one recipient name in the address book. As to the single-touch key, it has been adopted to enable registration of a plurality of pieces of transmission destination information for one key, as in the address book. Therefore, though the single-touch key and the group key have different names, these keys realize similar functions. In the present specification, these keys will be generally referred to as "short-cut key."

When a document is to be transmitted using a single-touch key having a plurality of transmission destinations registered, due to the function of the key, it is possible that one document is sent to a plurality of transmission destinations including a terminal not intended by the user, though transmission to one destination only (only one facsimile or one mail account) is desired. For example, though it is desired to transmit to facsimile only, an electronic mail may also be sent inadvertently.

A solution to such a problem is proposed, for example, in Japanese Patent Laying-Open Nos. 2002-125088 (hereinafter referred to as '088 Reference) and 2003-152945 (hereinafter referred to as '945 Reference). Specifically, '088 and '945 References disclose a technique of determining the transmission mode (facsimile transmission or electronic mail transmission) from the pressed mode key at the time of document transmission and sending document data to the destination information corresponding to the determined mode (if it is the facsimile transmission mode, to the facsimile number and if it is the electronic mail transmission mode, to the mail address). Accordingly, if both facsimile number and mail address are registered for one transmission destination, appropriate transmission process in accordance with the user instruction can be executed.

According to the technique disclosed in '088 Reference, however, if a document is to be transmitted to a plurality of recipients as in the case of multicast transmission described above, it is necessary to set the transmission mode (press a key) for every destination, which results in low working efficiency.

Further, according to '945 Reference, if a piece of destination information (mail address/FAX number) corresponding to the set transmission mode (internet FAX/normal FAX) is not registered when the single-touch key is pressed, it is necessary to select the transmission destination again, which results in low working efficiency. Further, since an indication "not-registered" appears after the user presses the single-touch key, it may be disturbing for the user.

SUMMARY OF THE INVENTION

As a not-publicly-known solution to the problem described above, it is possible to display, when the user invokes the address book to designate a recipient of transmission, not all the recipients of transmission (recipient names) but only the recipients of transmission having transmission destination information corresponding to the selected transmission mode (FAX number or electronic mail address) registered. Further, after the user designates (selects) the recipient of transmission and instructs transmission, transmission not to all pieces of transmission information registered for the designated recipient of transmission but only to the piece of transmission destination information corresponding to the selected transmission mode is possible. Such an approach will be specifically described using a basic screen image for the facsimile mode as an example of the basic screen images for various operational modes displayed on the operation unit of an image processing apparatus.

Referring to FIG. 1, on a system area 200 of a basic screen image 300 of the facsimile mode, characters "FAX" indicating that it is in the facsimile mode and job status are displayed. On a function selection area 210, a key 202 for displaying an address book and keys for changing settings of conditions such as parameters and various functions related to the facsimile mode are displayed. On a preview area 240, virtual ten-keys 242 for entering a facsimile number and a number display area 244 are displayed. Number display area 244 is an area for displaying an entered facsimile number of the recipient of transmission. On preview area 240, a window 246 indicating current status of facsimile transmission and the like is also displayed. On an action panel area 260, keys for executing recommended functions in the facsimile mode are displayed. On a task trigger area 280, keys for instructing execution of jobs such as a start key, a scan-in key and the like are displayed.

If a key 202 for displaying the address book is touched while the basic screen image of the facsimile mode shown in FIG. 1 is displayed, an address book window 900 shown in FIG. 2 is displayed on the operation unit. Address book window 900 is displayed on basic screen image 300 of the facsimile mode. On a recipient name display area 916, recipient names registered with the address book stored in a hard disk (hereinafter denoted as HDD) of the image processing apparatus are displayed in alphabetical order. In the address book, transmission destination information for image transmission (facsimile numbers, electronic mail addresses and the like) and information specifying the type of image transmission (facsimile, electronic mail and the like) are registered in correspondence with the recipient names. It is possible to register a plurality of pieces of transmission destination information for one recipient name, regardless of the type of image transmission.

At the head of each recipient name in recipient name display area 916, a check box 918 and an icon 920 indicating that it is a recipient of facsimile transmission are displayed. If there is a large number of registrations and only a part is displayed, the recipient names that are not displayed appear when an up-key 908, a down-key 910, or a slide bar 906 is operated.

Keys 912 and 914 are keys for setting conditions of narrowing down the recipient names to be displayed on recipient name display area 916. Below keys 912 and 914, a set state is displayed. In FIG. 2, no narrowing-down by category is done, recipient names having facsimile numbers registered are displayed, and recipient names not having any registered facsimile number are not displayed. The narrowing-down is done in accordance with the information specifying the type of image transmission registered corresponding to the recipient name. Whether the recipient names narrowed-down in accordance with the type of designated job (image transmission mode) or all recipient names are to be displayed is determined as an initial setting of the image processing apparatus. Here, it is assumed that, as the initial setting, when display of the address book is instructed, recipient names narrowed-down in accordance with the designated image transmission mode (mode of the basic screen image) are displayed. When key 904 is touched, address book window 900 is erased.

If key 912 for narrowing-down in accordance with the job type (specifically, the type of image transmission) is touched, a narrowing-down window 930 shown in FIG. 3 is displayed on address book window 900. On narrowing-down window 930, keys for designating conditions for narrowing-down are displayed. A key 934 is for displaying all recipient names without narrowing down, or regardless of the type of image transmission. A key 936 is for displaying only the recipient names having electronic mail addresses registered. A key 938 is for displaying only the recipient names having facsimile numbers registered. Other than these, a shared folder key 940, an FTP/Desktop key 942 and an Internet FAX key 944 are displayed. These are keys for displaying only the recipient names having transmission destination information registered for respective types of image transmission. The transmission destination information includes, for the shared folder, a path to the shared folder, for FTP/Desktop, a path to a server or the like providing the FTP service, and for the Internet FAX, an electronic mail address. Narrowing-down window 930 shown in FIG. 3 is a screen image displayed in response to touching of key 912 on the screen image of FIG. 2 (basic screen image for facsimile mode) and, hence, a key 938 is highlighted. When key 932 is touched, narrowing-down window 930 is erased.

If the narrowing-down condition corresponding to the touched key is set in narrowing-down window 930 and the narrowing-down window 930 is closed, a basic screen image of the image transmission mode corresponding to the set narrowing-down condition is displayed. By way of example, when key 936 is touched and thereafter key 932 is touched, narrowing-down window 930 is closed and the screen image shown in FIG. 4 is displayed. The screen image of FIG. 4 is different from that of FIG. 2, and it is a basic screen image of electronic mail transmission with the indication of "E-mail" at an upper-left corner. On the action panel area, a key 966 unique to electronic mail transmission is displayed. Different from address book window 900, address book window 960 has an indication of "E-mail" below key 962, and on recipient name display area 916, only the recipient names having electronic mail addresses registered therewith are displayed. Preceding each recipient name, an icon 964 indicating an electronic mail is displayed.

FIG. 5 shows a setting screen image of the image processing apparatus. A setting screen image 980 is displayed when, for example, an administrator operates the operation unit in a prescribed manner. FIG. 5 shows some items for initial setting of the image processing apparatus. The contents set on setting screen image 980 are read from HDD to a prescribed area of an RAM when the image processing apparatus is activated. When a registration key 984 is touched, corresponding data is updated.

An area 982 related to default settings of the address book is for setting whether or not only the transmission destination information of the designated image transmission mode is to be used, when a recipient name is selected from the address book as described above. In FIG. 5, a check box of "APPLY ONLY DESTINATION CORRESPONDING TO TRANSMISSION MODE" is checked, meaning that transmission is to be made only to the piece of transmission information which corresponds to the transmission mode, among the pieces of transmission destination information registered in correspondence with each recipient name. With this state of setting, if the facsimile mode is selected and a recipient name is selected from among the plurality of recipient names displayed in address book window 900, only the facsimile number corresponding to the selected recipient name is determined to be the transmission destination.

Even if transmission destination information other than the facsimile number such as the electronic mail address is registered corresponding to the selected recipient name, it is not used as the transmission destination. On the other hand, if the check box of "APPLY ONLY DESTINATION CORRESPONDING TO TRANSMISSION MODE" is not checked and transmission destination information other than the facsimile number such as the electronic mail address is registered corresponding to the selected recipient name, it is also determined to be the transmission destination.

What type of list is the recipient name list displayed in address book window 900 is indicated by a text such as "FAX" or "E-mail" below key 912. The transmission destination to be determined, however, does not depend on the indication below key 912. The destination is determined depending on the recipient name selected by address book window 900 and on whether or not the setting of "APPLY ONLY DESTINATION CORRESPONDING TO TRANSMISSION MODE" is valid (checked).

The setting related to "DEFAULT DISPLAY CATEGORY" in area 982 is default setting for designating a category to which the displayed recipient name belongs, when address book window 900 is displayed. In FIG. 5, no category is set. With this setting, "NARROW-DOWN OFF" is displayed on key 914, as shown in FIG. 2.

If a check box of "DISPLAY ALL TYPE OF DESTINATIONS REGARDLESS OF DISPLAYED MODE" is checked, all recipient names are displayed regardless of the designated transmission mode, when the address book is displayed. In FIG. 5, the check box is not checked and, therefore, when display of the address book is instructed, recipient names narrowed-down in accordance with the designated image transmission mode are displayed. Further, in FIG. 5, image setting direction for image transmission is set.

As the image processing apparatus is set in this manner and only the recipient names corresponding to the designated (narrowed-down) transmission mode are displayed on address book window 900 rather than the recipient names of all transmission modes, it is possible for the user to easily select a recipient without making an operation error. Further, when the user selects a specific recipient name from the listed recipient names and sends a facsimile, if the default setting of address book is to use only the destination information corresponding to the transmission mode, image transmission is executed only to the facsimile number, even if a destination other than the facsimile number is registered corresponding to the selected recipient name. Therefore, even if transmission destination information other than the facsimile number, such as the electronic mail address, is registered corresponding to the selected recipient name, transmission to such an address can be prevented.

Assume, however, that only the transmission information such as the FAX number and the electronic mail address is registered with a short-cut key such as the single-touch key allowing registration of a plurality of pieces of transmission destination information and information representing the transmission mode is not registered. In that case, even if the narrowing-down function with the transmission mode is ON (valid), such narrowing-down function cannot be applied to transmission using the short-cut key. Therefore, if a plurality of pieces of transmission destination information are registered with the short-cut key, transmission to all destinations occur. By way of example, though it is desired to transmit to facsimile only, an electronic mail may also be sent, possibly embarrassing the receiver.

In view of the foregoing, it is desirable to provide an image processing apparatus that can efficiently prevent transmission to a destination not intended by the user caused by double-transmission or the like even when a plurality of pieces of transmission destination information is registered with a short-cut key and can prevent embarrassment to the user.

According to an aspect, the present invention provides an image processing apparatus, including: a storage unit storing a plurality of pieces of transmission destination information representing transmission destinations of image transmission in correspondence with a short-cut key for instructing image transmission; a display unit displaying the short-cut key; an operation unit detecting selection of the short-cut key; and a control unit causing, if selection of the short-cut key is detected by the operation unit and a prescribed condition is satisfied, the display unit to display the plurality of pieces of transmission destination information stored in correspondence with the selected short-cut key. The operation unit receives a selection operation for selecting at least one piece of transmission destination information from the plurality of pieces of transmission destination information displayed on the display unit. The control unit determines the selected piece of transmission destination information as a transmission destination of image transmission made by the selection of the short-cut key.

Preferably, after completion of the selection operation, the control unit causes the display unit to display a screen image confirming whether the selection operation is to be done if the short-cut key is selected next time. When the operation unit receives information of necessity of selection as an instruction as to whether the selection operation is to be done or not, the control unit stores data indicating the necessity of selection in correspondence with the short-cut key in the storage unit, and the prescribed condition is satisfied if the information of the necessity of selection is an instruction to execute the selection operation.

More preferably, if an instruction not to execute the selection operation is received by the operation unit, the control unit stores selection information for determining the transmission destination information selected to be a transmission destination of image transmission when the short-cut key is selected, in the storage unit in correspondence with the short-cut key.

More preferably, if selection of a short-cut key is detected by the operation unit and the data indicating the necessity of selection corresponding to the selected short-cut key is data not to execute the selection, the control unit determines a transmission destination of image transmission made by the selection of the short-cut key, from among a plurality of pieces of transmission destination information corresponding to the short-cut key, in accordance with the selection information corresponding to the short-cut key.

Preferably, the storage unit stores the transmission destination information to transmit image data as an address book in correspondence with recipient names, and the short-cut key is stored separately from the address book.

According to the present invention, transmission can be done after the user touches a short-cut key and the transmission destination is selected. It is not the case that when the short-cut key is touched, transmission is automatically done to the transmission destination or destinations registered with the short-cut key. Therefore, transmission to a destination not intended by the user can be prevented and, hence, the user can use the short-cut key with ease.

Further, according to the present invention, once the user touches a specific short-cut key and determines a transmission destination, the determined transmission destination can be used directly when the same short-cut key is touched next time. Thus, more efficient transmission becomes possible.

Further, according to the present invention, even if the user once touches a specific short-cut key and determines a transmission destination, it is possible to set the transmission destination again when the same short-cut key is touched next time. This makes the use of the destination short-cut key safer and easier.

Further, the short-cut key is stored separately from the address book and, therefore, the registered information for the short-cut key is not influenced even when the address book is changed. Therefore, the user can use the short-cut key with ease.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
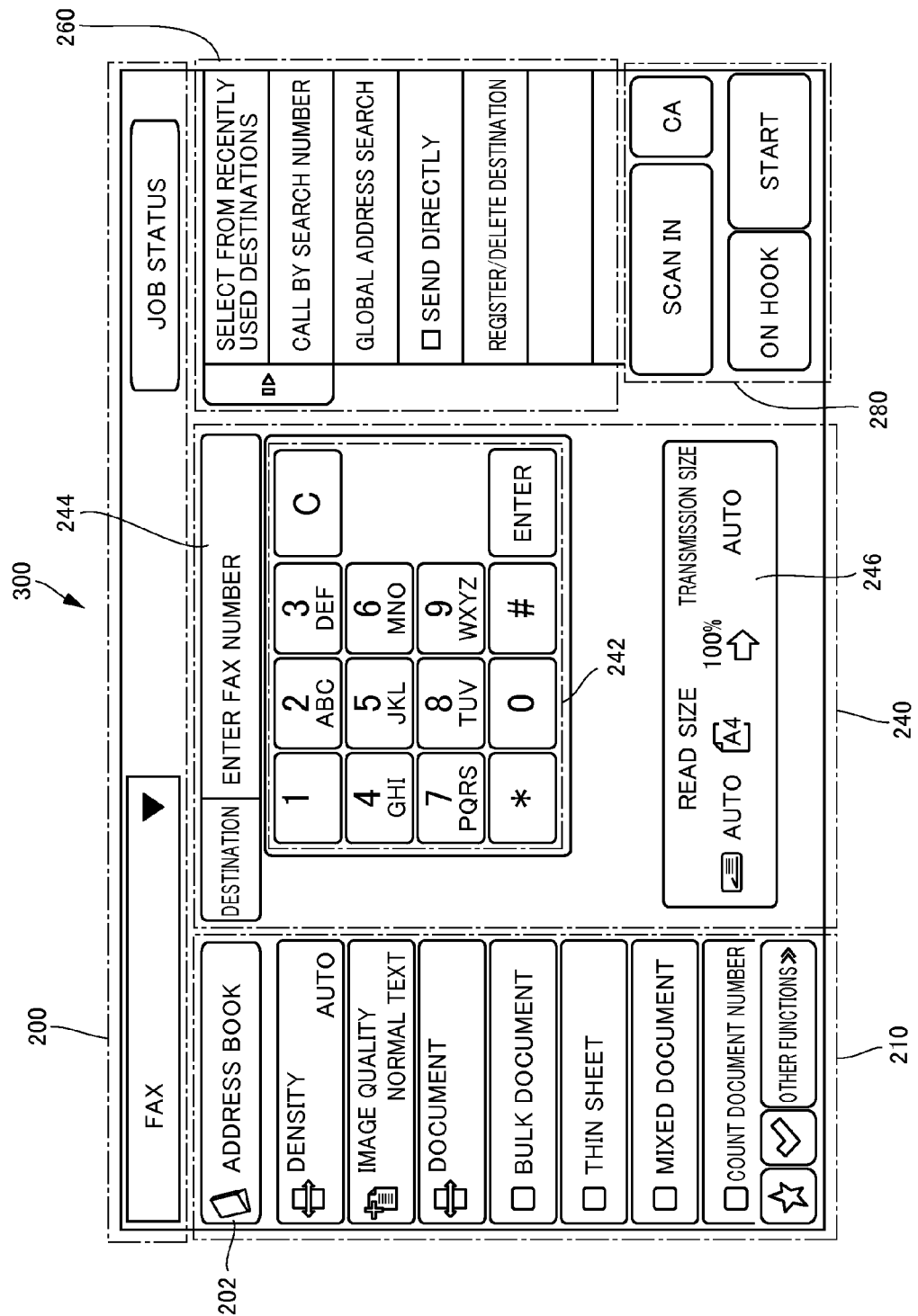
FIG. 1 shows a basic screen image of the facsimile mode.
Figure 2:
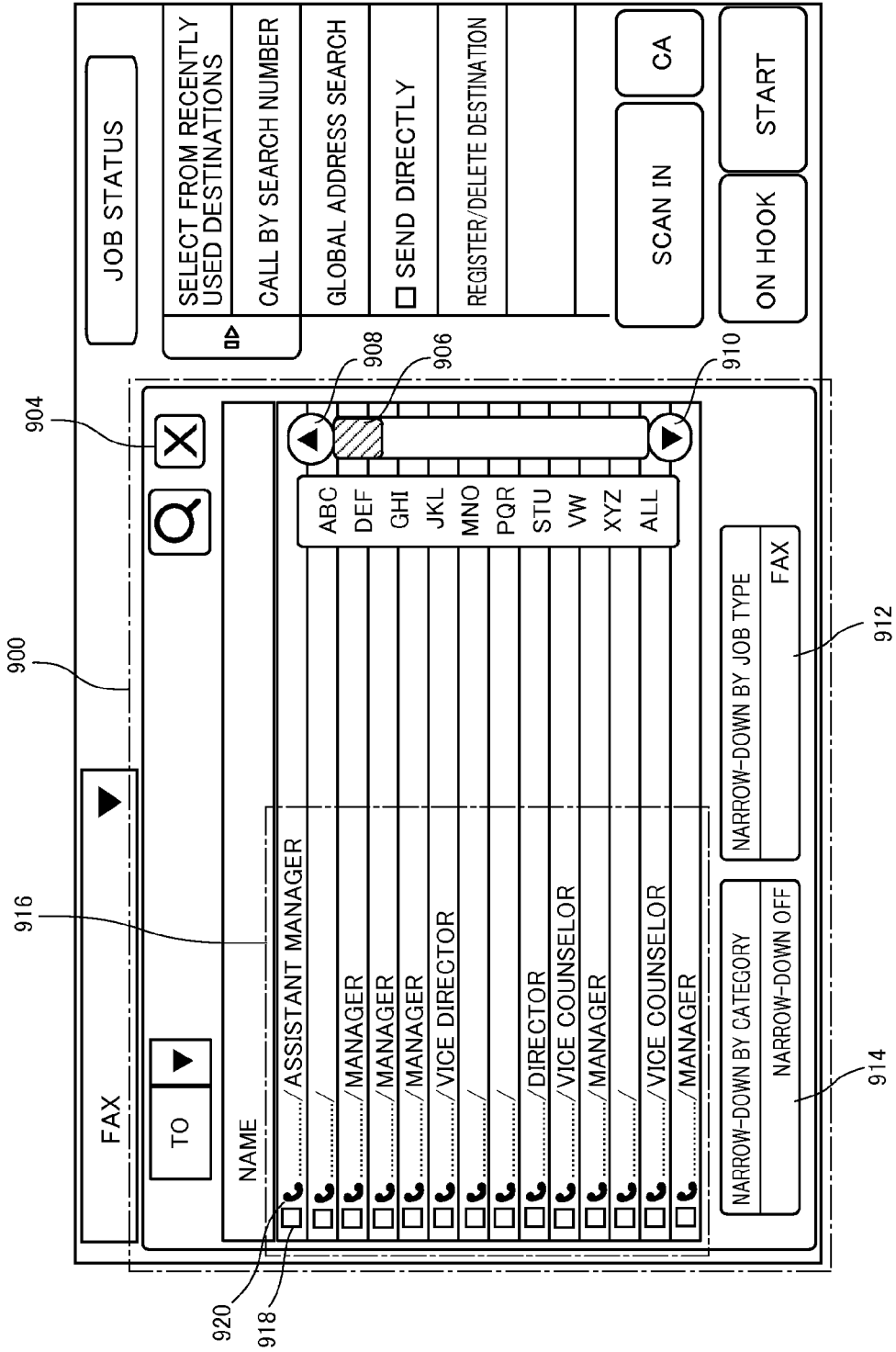
FIG. 2 shows a screen image having an address book window displayed on the basic screen image.
Figure 3:
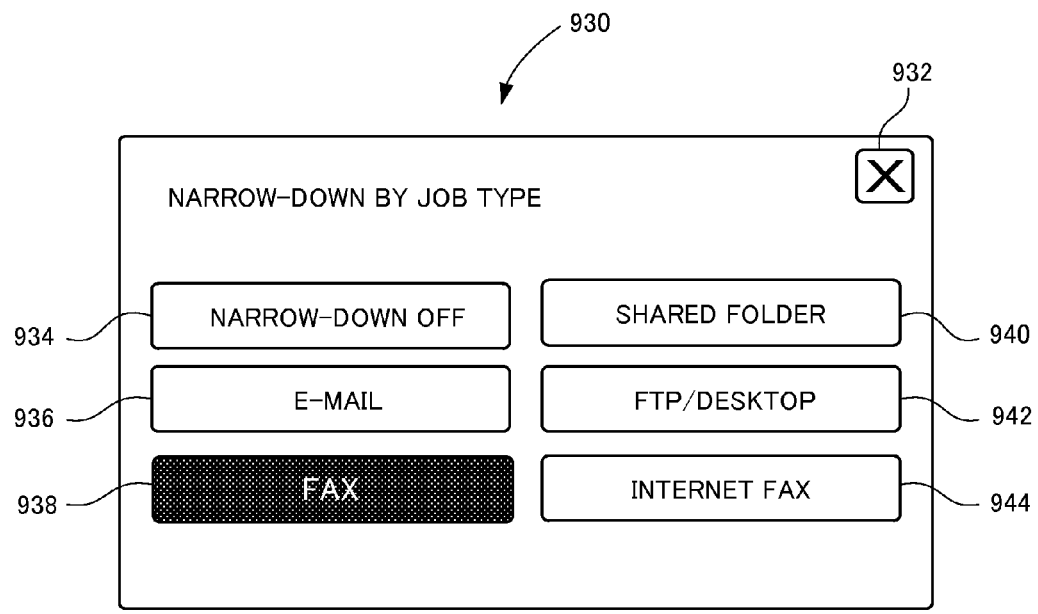
FIG. 3 shows a narrowing-down window.

In the following embodiment, the same components are denoted by the same reference characters. Their names and functions are also the same. Therefore, detailed description thereof will not be repeated.

The image processing apparatus in accordance with the present embodiment is a digital multifunction peripheral having a plurality of functions including scanner function, facsimile function, electronic mail function, copy function, printer function and the like.

Figure 6:
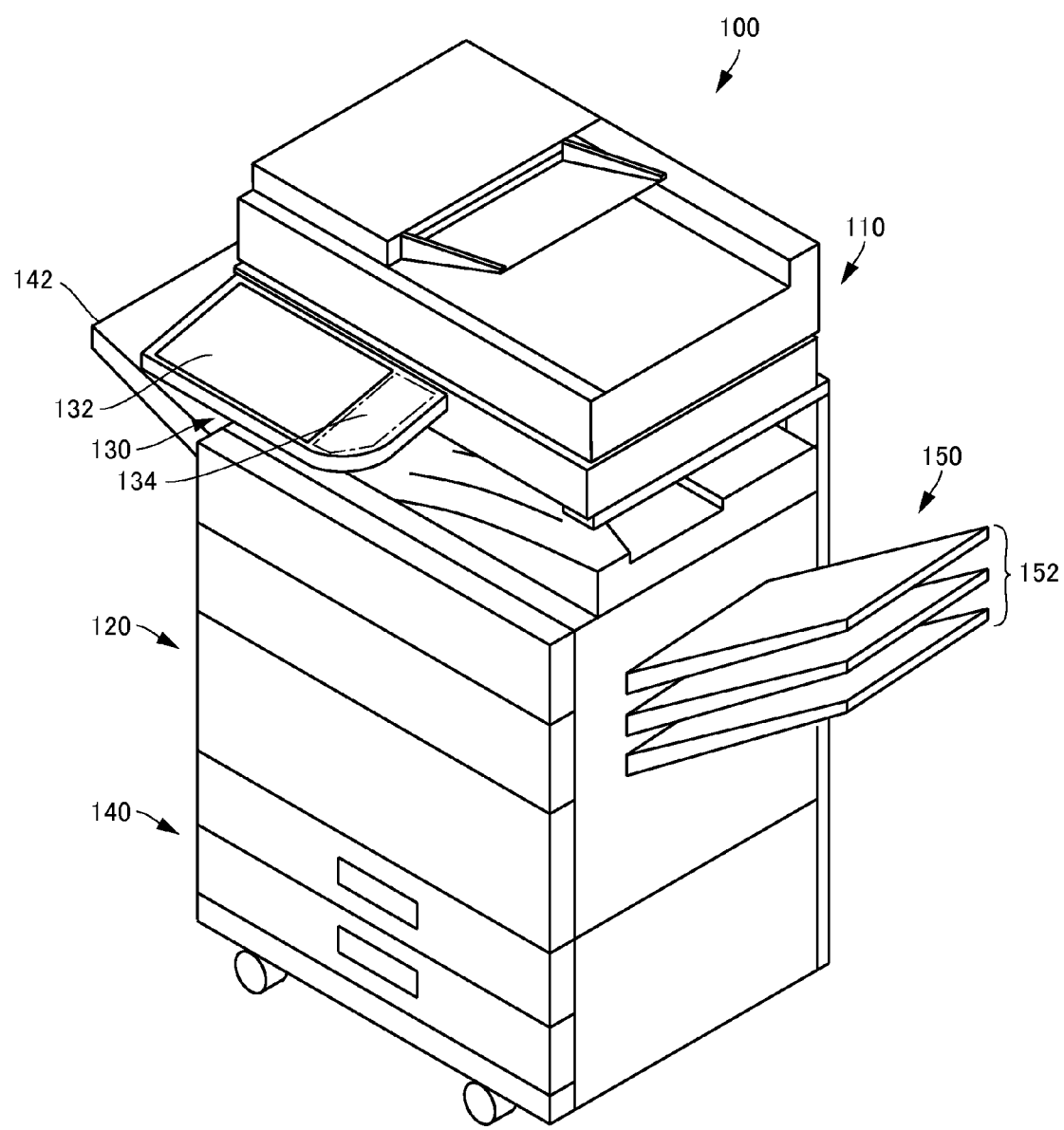
FIG. 6 is a perspective view showing an appearance of the image processing apparatus in accordance with an embodiment of the present invention.

Referring to FIG. 6, an image processing apparatus 100 includes a document reading unit 110, an image forming unit 120, an operation unit 130, a paper feed unit 140, a manual paper feed tray 142, and a paper discharge unit 150. Operation unit 130 is provided with a touch-panel display 132 and an operation key unit 134. Touch-panel display 132 includes a display panel implemented, for example, by a liquid crystal panel, and a touch-panel placed on the display panel, for detecting a touched position. On operation key unit 134, a few function keys, not shown, are arranged. Ten-keys may be arranged on operation key unit 134.

Figure 7:
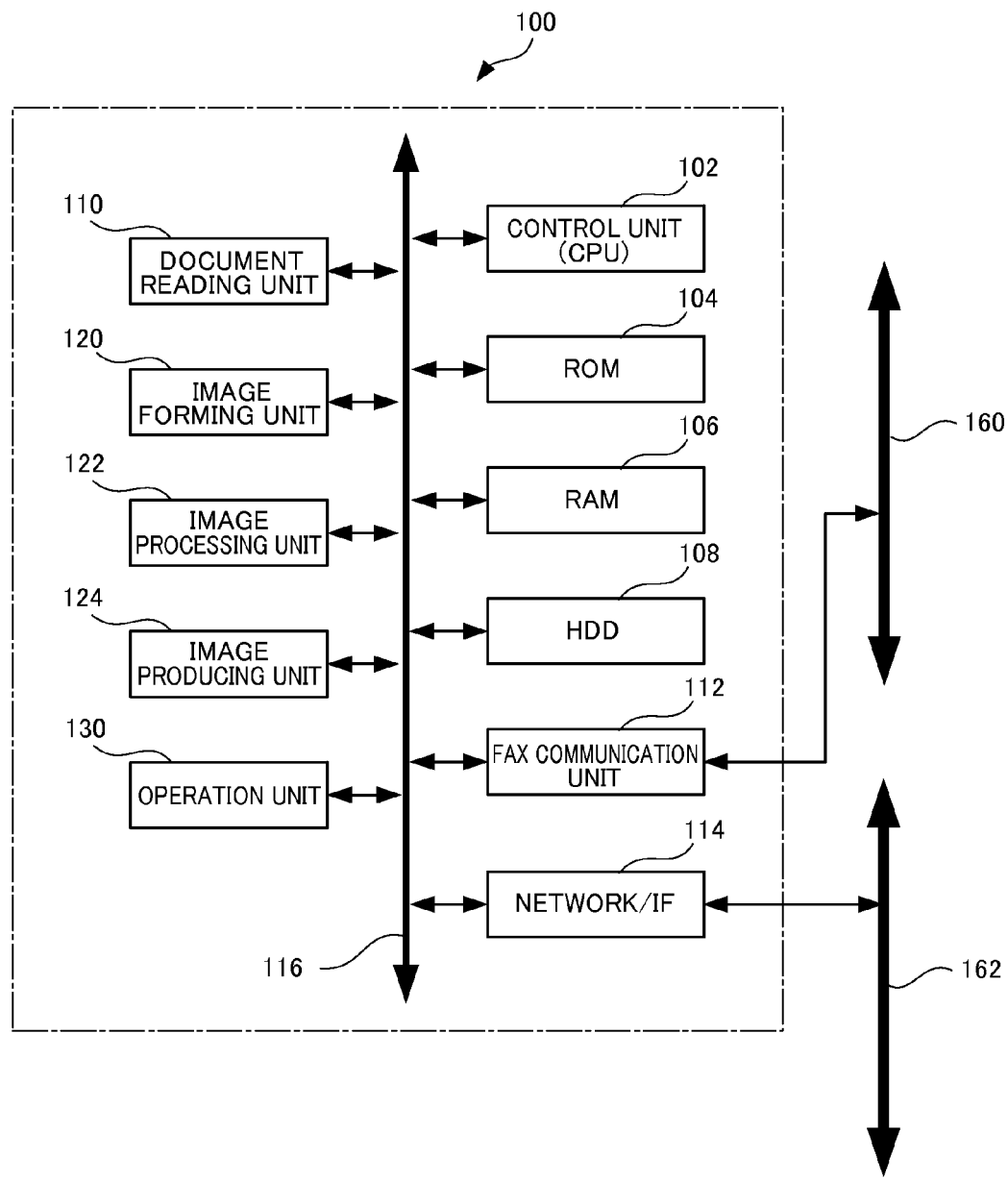
FIG. 7 is a block diagram showing a configuration of the image processing apparatus shown in FIG. 1.

Referring to FIG. 7, image processing apparatus 100 includes: a control unit (hereinafter referred to as a CPU (Central Processing Unit)) 102 for overall control of image processing apparatus 100; an ROM (Read Only Memory) 104; an RAM (Random Access Memory) 106; and an HDD (Hard Disk Drive) 108. ROM 104 is a non-volatile storage device that retains data even when power is turned off. ROM 104 stores programs and data necessary for controlling operations of image processing apparatus 100. RAM 106 is a volatile storage device. HDD 108 is a non-volatile storage device.

Image processing apparatus 100 further includes an image processing unit 122, an image producing unit 124, a FAX communication unit 112, a network I/F 114 and a bus 116. CPU 102, ROM 104, RAM 106, HDD 108, FAX communication unit 112, network I/F 114, document reading unit 110, image forming unit 120, image processing unit 122, image producing unit 124 and operation unit 130 are connected to bus 116. Data (including control information) are exchanged between each of these components and units through bus 116. CPU 102 reads a program from ROM 104 through bus 116 to RAM 106 and executes the program using a part of RAM 106 as a work area. Specifically, CPU 102 controls various components and units forming image processing apparatus 100 and realizes each of the functions of image processing apparatus 100 in accordance with a program or programs stored in ROM 104.

FAX communication unit 112 is connected to an external public telephone line 160, and it includes a FAX modem as an interface realizing FAX communication between image processing apparatus 100 and an external device through public telephone line 160.

Network I/F 114 is connected to an external network 162, and includes, for example, an NIC (Network Interface Card) as an interface for realizing communication between image processing apparatus 100 and an external device through network 162.

Image communication mode available on image processing apparatus 100 includes facsimile mode, Internet facsimile mode, electronic mail communication mode (scan-to-mail), image transmission mode (scan-to-folder) and the like. The facsimile mode refers to a mode of transmitting/receiving image data though public telephone line, using the FAX modem. The Internet facsimile mode refers to a mode of transmitting/receiving image data through the Internet, using NIC. The electronic mail communication mode (scan-to-mail) refers to a mode of transmitting/receiving image data by attaching the data to an electronic mail. The image transmission mode (scan-to-folder) refers to a mode of transferring image data to a specific folder of a PC through a network.

Document reading unit 110 includes a CCD (Charge Coupled Device) for reading an image, and a document detection sensor for detecting a document set on a platen or on an automatic document feeder (ADF). Document reading unit 110 reads the document and inputs image data. The image data is temporarily stored in an image memory (not shown). Image processing unit 122 executes various image processing operations on the read image data. Image forming unit 120 prints image data on a sheet of recording paper. Image data is stored in HDD 108 as needed.

Paper feed unit 140 holds sheets of recording paper for forming images. Manual paper feed tray 142 is a tray for manually feeding sheets of recording paper.

Operation unit 130 receives inputs such as an instruction by the user to image processing apparatus 100. An image displayed on touch-panel display 132 is produced by a screen image producing unit 124. The user confirms the state and job processing status of image processing apparatus 100, by the screen images displayed on touch-panel display 132. The user can set functions and instruct operations of image processing apparatus 100 by selecting keys displayed on touch-panel display 132 on the touch-panel superposed on the display panel (by touching the corresponding portions on the touch-panel).

CPU 102 monitors the user operation on touch-panel display 132, input keys and the like provided on operation unit 130, and displays pieces of information to be notified to the user, such as the information on the state of image processing apparatus 100, on touch-panel display 132.

In the following, each of the modes for executing the functions available on image processing apparatus 100 (copy function, printer function, scanner function and facsimile function) will be briefly described.

(Copy Mode)

When image processing apparatus 100 is used as a copy machine, image data of the document (hereinafter also referred to as document data) read by document reading unit 110 is output as a copy from image forming unit 120.

By the CCD provided at document reading unit 110, images of the document set at a reading position can be electronically read. The read image data is completed as output data (print data) on the image memory, and stored in HDD 108. If there is a plurality of documents, the reading and storage operations are repeated. Thereafter, based on the process mode instructed from operation unit 130, the image data stored in HDD 108 is successively read at appropriate timing and transmitted to the image memory. Then, the image data is transmitted to image forming unit 120 timed with image formation at image forming unit 120.

When the read image is to be printed on a plurality of pages, the image data is stored page by page as output data in the similar manner in HDD 108, transmitted from HDD 108 to the image memory, and transmitted to image forming unit 120 timed with image formation, repeatedly for the number of pages to be output.

At paper feed unit 140, a sheet of recording paper is drawn by a pick-up roller and conveyed by a plurality of conveyer rollers to image forming unit 120. At image forming unit 120, a charged photoreceptor drum is exposed in accordance with the input image data, whereby an electrostatic latent image corresponding to the image data is formed on a surface of photoreceptor drum. Toner is applied to the electrostatic latent image portions on the photoreceptor drum and, thereafter, the toner image is transferred to a conveyed sheet of recording paper by means of a transfer belt. Thereafter, the sheet of recording paper is heated and pressed (whereby the image is fixed on the sheet of paper), and then the sheet is discharged to paper discharge tray 152.

(Printer Mode)

When image processing apparatus 100 is used as a printer, image data received through network I/F 114 is output from image forming unit 120 through the image memory and the like.

Network I/F 114 receives image data from a terminal (not shown) such as a PC connected to network 162. The received image data is transmitted page by page as output image data to the image memory, and stored in HDD 108. Thereafter, the image data is again transmitted from HDD 108 to the image memory, and transmitted to image forming unit 120 as in the copy mode described above, and image formation takes place.

(Scanner Mode)

When image processing apparatus 100 is used, for example, as a network scanner, image data of the document read at document reading unit 110 is transmitted from network I/F 114 through network 162 to a terminal. Here again, the document is electronically read by the CCD provided at document reading unit 110. The read image data is completed as output data on the image memory, and stored in HDD 108. Thereafter, the image data is again transmitted from HDD 108 to the image memory, and after communication with a transmission destination designated through operation unit 130 is established, transmitted from network I/F 114 to the designated transmission destination.

(Facsimile Mode)

Image processing apparatus 100 can transmit/receive FAX to and from an external facsimile device through FAX communication unit 112 and public telephone line 160.

When image processing apparatus 100 is used as a facsimile machine, image processing apparatus 100 is capable of reading image data from HDD 108, converting the data to a data format for facsimile transmission, and transmitting to an external facsimile machine through FAX communication unit 112 and public telephone line 160. Further, image processing apparatus 100 is capable of forming image data from the data received through facsimile from a facsimile machine on the image memory and, in the similar manner as described above, storing the image data in HDD 108 and executing printing using image forming unit 120.

When facsimile transmission is to be executed, the user operates the screen image displayed on touch-panel display 132 and operation key unit 134 to set conditions for facsimile transmission and, thereafter, presses a key instructing execution of facsimile transmission. The conditions for facsimile transmission include facsimile number of the recipient, document size, transmission image density, transmission image quality and the like. When multicast transmission of transmitting one document to multiple destinations is to be done, the facsimile number of each destination and conditions for transmission for each destination are set.

Figure 8:
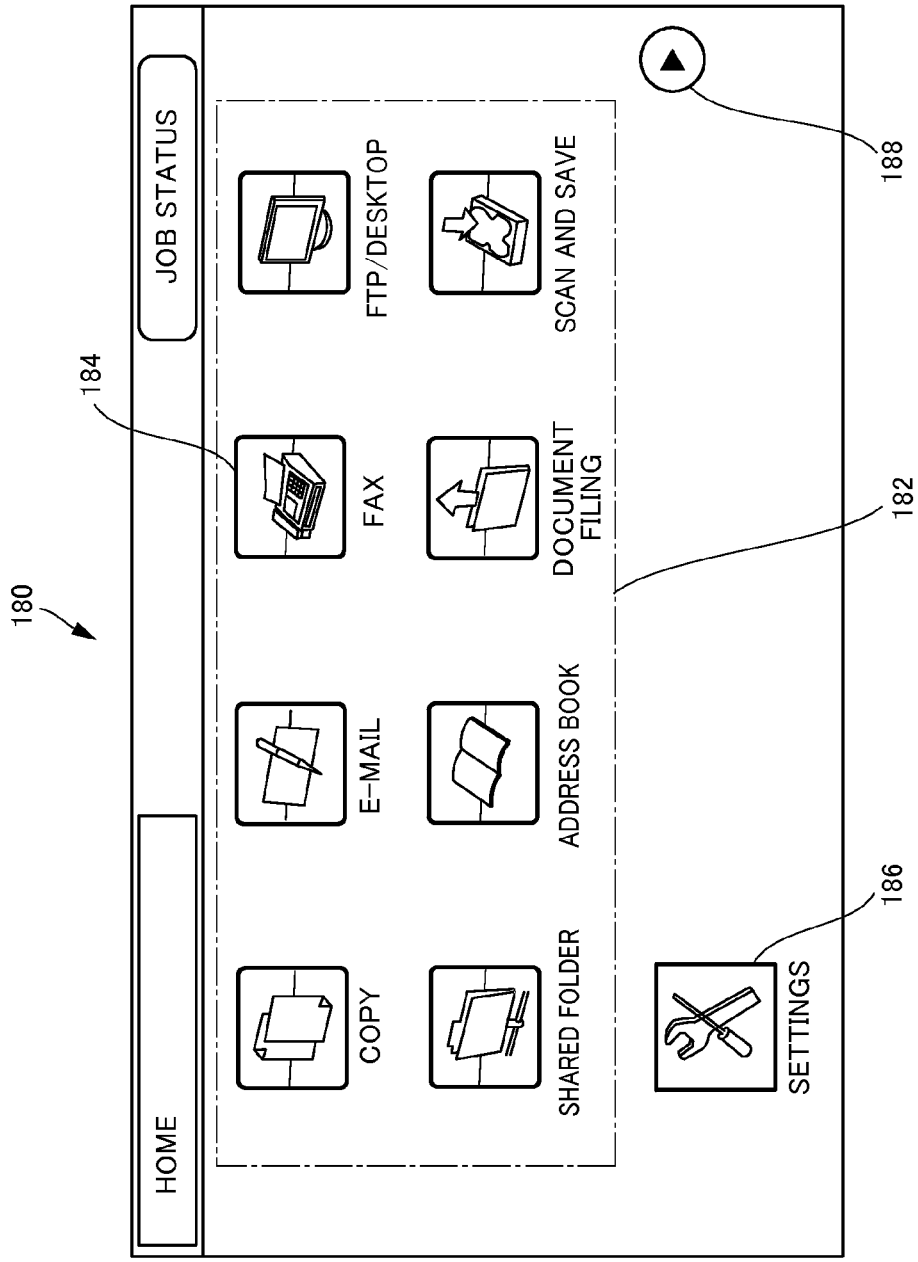
FIG. 8 shows a home screen image displaying keys for displaying basic screen images of various operational modes.
Figure 9:
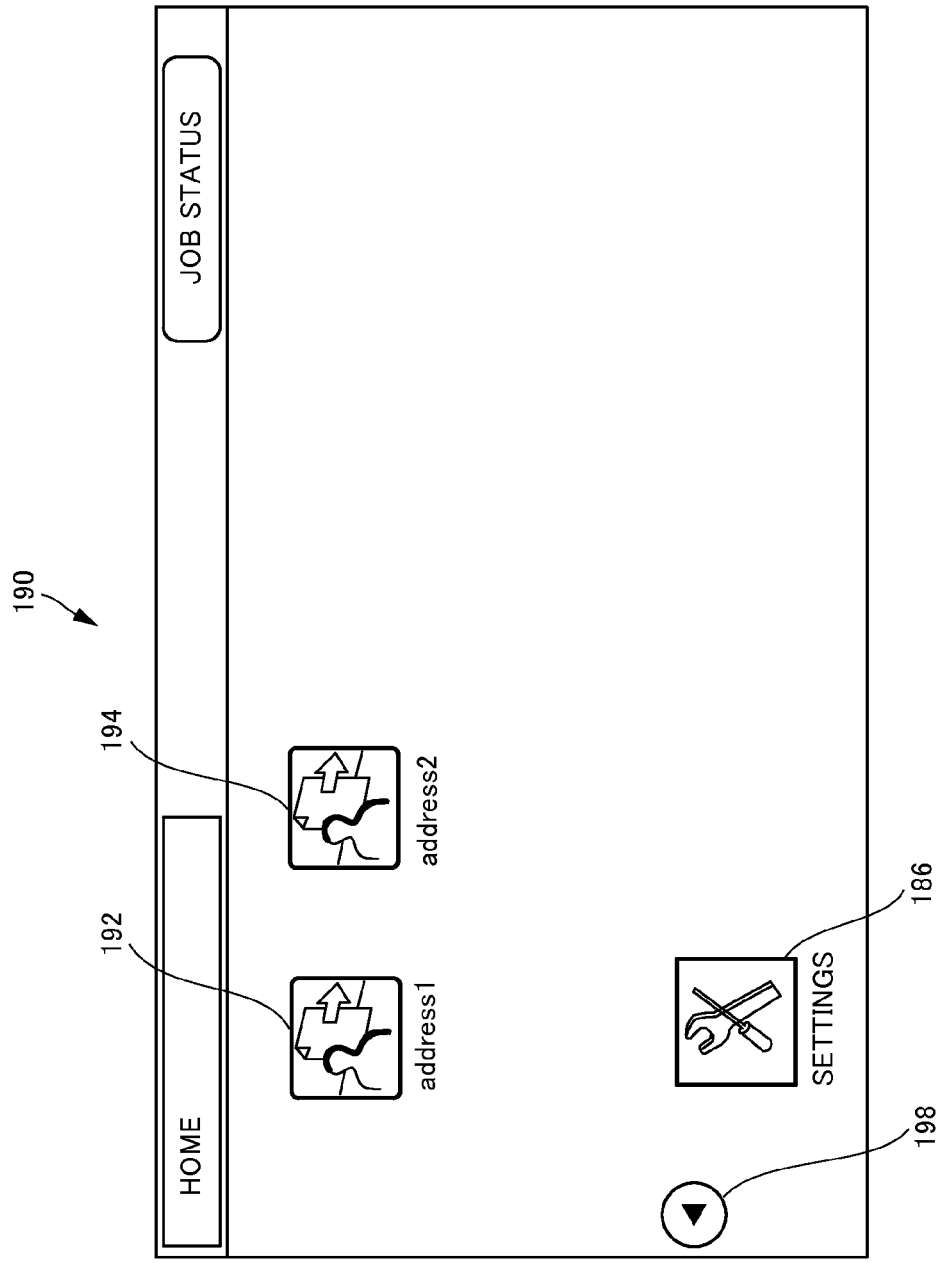
FIG. 9 shows a home screen image displaying a destination short-cut key.

Referring to FIG. 8, by touching a key displayed in an area 182 of a home screen image 180 displayed on operation unit 130, the user can select each function and have the basic screen image of the corresponding mode displayed. In area 182, keys for selecting each of the modes, such as copy, E-mail and FAX are displayed. A setting key 186 is for system setting of image processing apparatus 100. A right-feed key 188 is a key for displaying the next home screen image and, when pressed, the next home screen image 190 such as shown in FIG. 9 is displayed. On home screen image 190 also, a plurality of keys are displayed as icons. Though two destination short-cut keys 192 and 194 are shown in FIG. 9, only one, or three or more destination short-cut keys may be displayed. Destination short-cut keys 192 and 194 are keys having the same function as the single-touch key and the group key. A left-feed key is a key to return to the previous home screen image, and when touched, home screen image 180 of FIG. 8 is displayed. By the destination short-cut key, the user can transmit to a set transmission destination without the necessity of opening the address book and selecting a transmission destination and, in this sense, it is a short-cut key.

Registration of the destination short-cut key may be done by an arbitrary manner. When it is displayed on home screen image 190, registration is done by a system administrator or the like from the system setting screen image of image processing apparatus 100. By way of example, on a system setting screen image that opens when setting key 186 is touched, the system administrator may set a piece of information (for example, key name) specifying the destination short-cut key, and may register transmission destination information to correspond thereto by designating, for example, a recipient name from an address book. If a plurality of pieces of transmission destination information are registered for a recipient name in the address book, all these pieces are registered with the short-cut key. Alternatively, if a plurality of pieces of transmission destination information are registered for a recipient name in the address book, only a piece or pieces of information selected therefrom may be registered with the destination short-cut key.

Here, it is assumed that for destination short-cut key 192, a name (specifically, "address1") is set as a piece of information for specifying the key, and the pieces of information of Table 1 below are registered correspondingly. As will be described later, a selection flag indicates whether or not it is selected as the transmission destination. The piece of destination information having the selection flag of "1" is selected, and the piece of destination information having the selection flag of "0" is not selected. Through the transmission modes are represented by texts in Table 1, they may be represented by codes or numerical values corresponding to respective modes.

TABLE 1

| Transmission mode | Transmission destination information | Selection flag |
|---|---|---|
| Fax | 03-1234-5678 | 0 |
| E-mail | name1@company1.co.jp | 0 |
| E-mail | name2@company1.co.jp | 0 |

Figure 10:
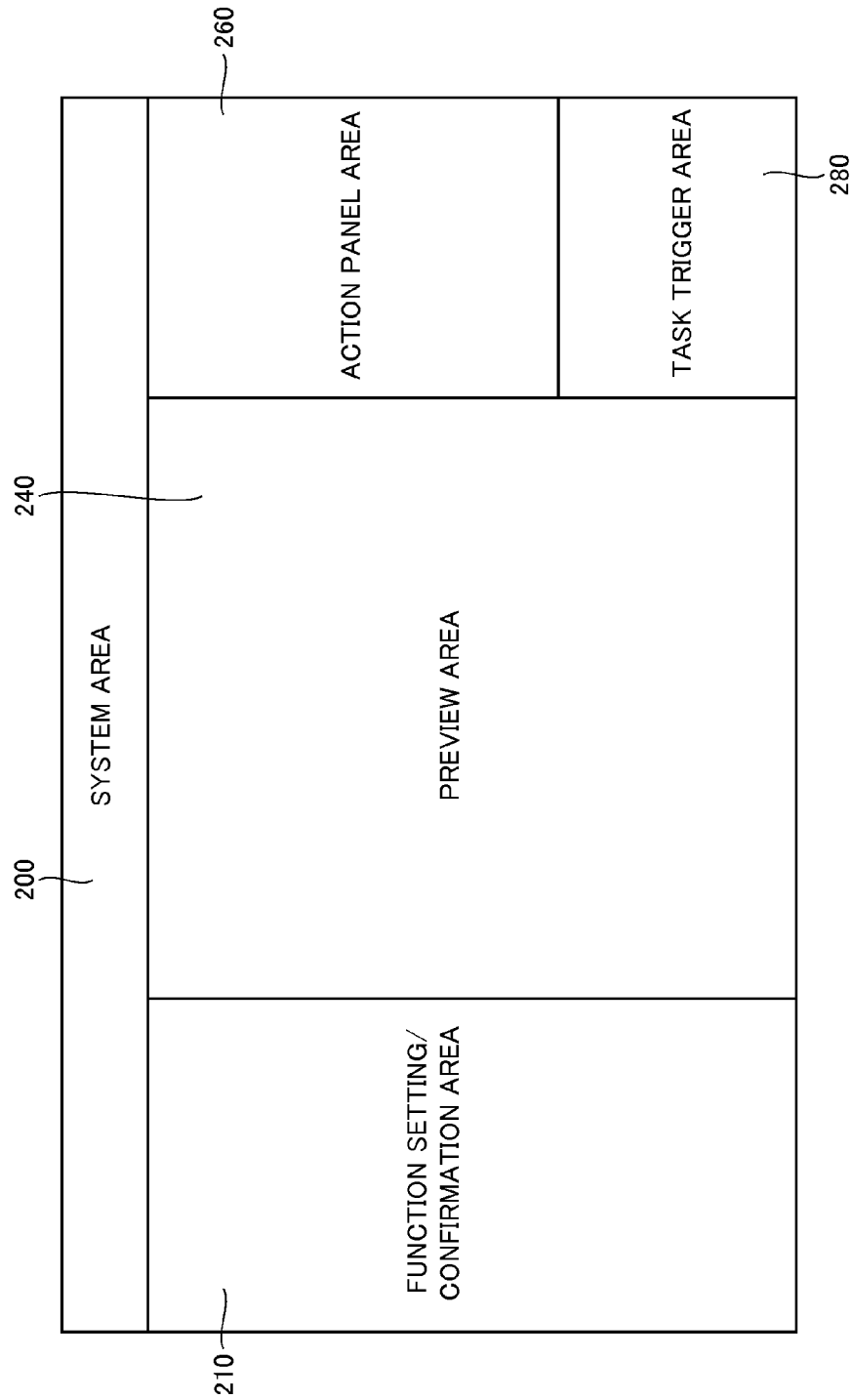
FIG. 10 shows a basic layout configuration of the basic screen image of each operational mode.

Referring to FIG. 8, when a key of each of the modes displayed on area 182 is touched, the basic screen image of each of the various operational modes is displayed. Referring to FIG. 10, the basic screen image of various operational modes is constituted by five areas including a system area 200, a function setting/confirmation area (hereinafter referred to as function selection area) 210, a preview area 240, an action panel area 260 and a task trigger area 280. These five areas are arranged as follows, in accordance with a basic layout. System area 200 is arranged at the uppermost portion of the basic screen image. Preview area 240 is arranged at the center of the basic screen image. Function selection area 210 is arranged on the left side of preview area 240 of the basic screen image. Action panel area 260 is arranged on the upper right side of preview area 240 of the basic screen image. Task trigger area 280 is arranged on the lower right side of preview area 240 of the basic screen image. These five areas forming the basic screen image of each of the operational modes described above and their basic layout are common in all operational modes.

Figure 11:
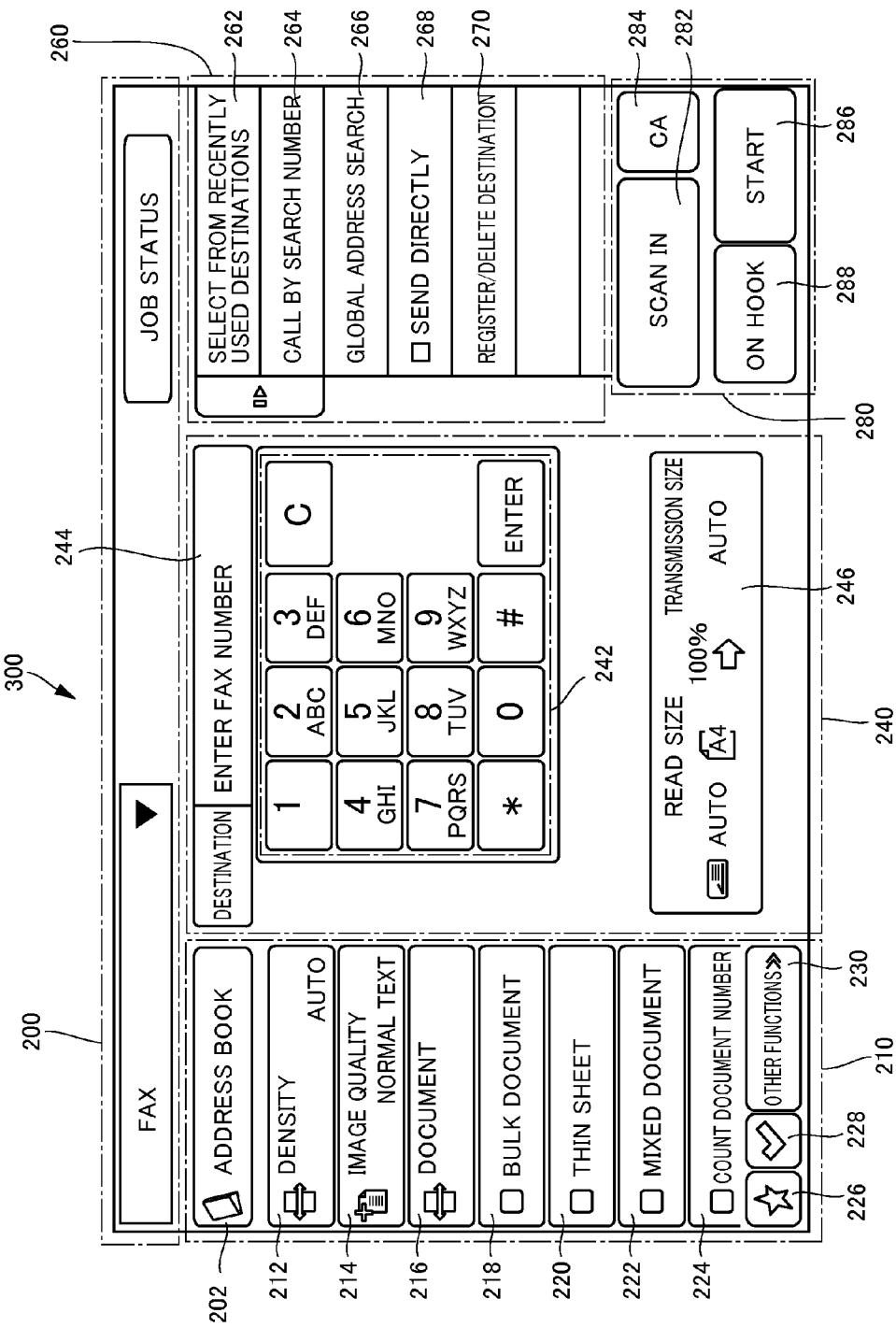
FIG. 11 shows a basic screen image of the facsimile mode displayed on the operation unit.

As an example of the basic screen image of various operational modes described above, the basic screen image for the facsimile mode, which is displayed when FAX key 184 on home screen image 180 is touched, will be described. Referring to FIG. 11, on system area 200 of basic screen image 300 of the facsimile mode, the text "FAX" indicating the facsimile mode and job status are displayed.

On function selection area 210 of basic screen image 300 of the facsimile mode, a key 202 for requesting display of the address book, and various setting keys for changing settings of conditions such as parameters and various functions related to the facsimile mode are displayed. In the present embodiment, as the various setting keys mentioned above, keys 212 to 224 are displayed. Key 212 is for changing density of the facsimile document. Key 214 is for changing the image quality of facsimile document. Key 216 is for changing transmission size or the like of facsimile document. Key 218 is for setting a bulk document mode. Key 220 is for setting a thin sheet reading function. Key 222 is for setting a mixed document function. Key 224 is for setting a document number counting function. If any of the keys 212 to 216 is touched, a setting screen image (such as a density setting screen image, an image quality setting screen image, or a document setting screen image) corresponding to the pressed key is displayed on touch-panel display 132. At a left end of each of keys 218 to 224, a check box is displayed. When any of the keys 218 to 224 is touched by the user, the check box of the touched key is checked, and the function corresponding to the touched key is set. Below the various setting keys 212 to 224 described above in function selection area 210, keys 226 and 228 for changing the display style of various setting keys 212 to 224 and "other functions" key 230 are displayed. Key 226 is for displaying only the setting keys related to functions registered as "favorites" in advance. Key 228 is for displaying only the setting keys of which setting has been changed. "Other functions" key 230 is for requesting display of a special function or functions other than the functions displayed on function selection area 210.

If it is impossible to display all setting keys as the object of display in function selection area 210, these setting keys are displayed scrollable upward/downward. It is noted, however, that the display positions of change keys 226 to 230 are fixed. It is possible for the user to scroll various setting keys upward/downward by a touching operation (scroll operation) or by a gesture operation (upward/downward flick operation), to switch the keys to be displayed.

On preview area 240 of basic screen image 300 of the facsimile mode, virtual ten-keys 242 for entering a facsimile number or the like and a number display area 244 are displayed. Virtual ten-keys 242 includes numeric keys of 0 to 9, a symbol key such as "#" key, a clear (C) key, and an ENTER key. Number display area 244 is for displaying the facsimile number of the recipient of transmission entered by the user.

On preview area 240, an icon representing whether a facsimile document is set on the platen or the automatic document feeder (ADF) (both not shown), and a window 246 including current setting status of facsimile transmission and the like are displayed.

Figure 4:
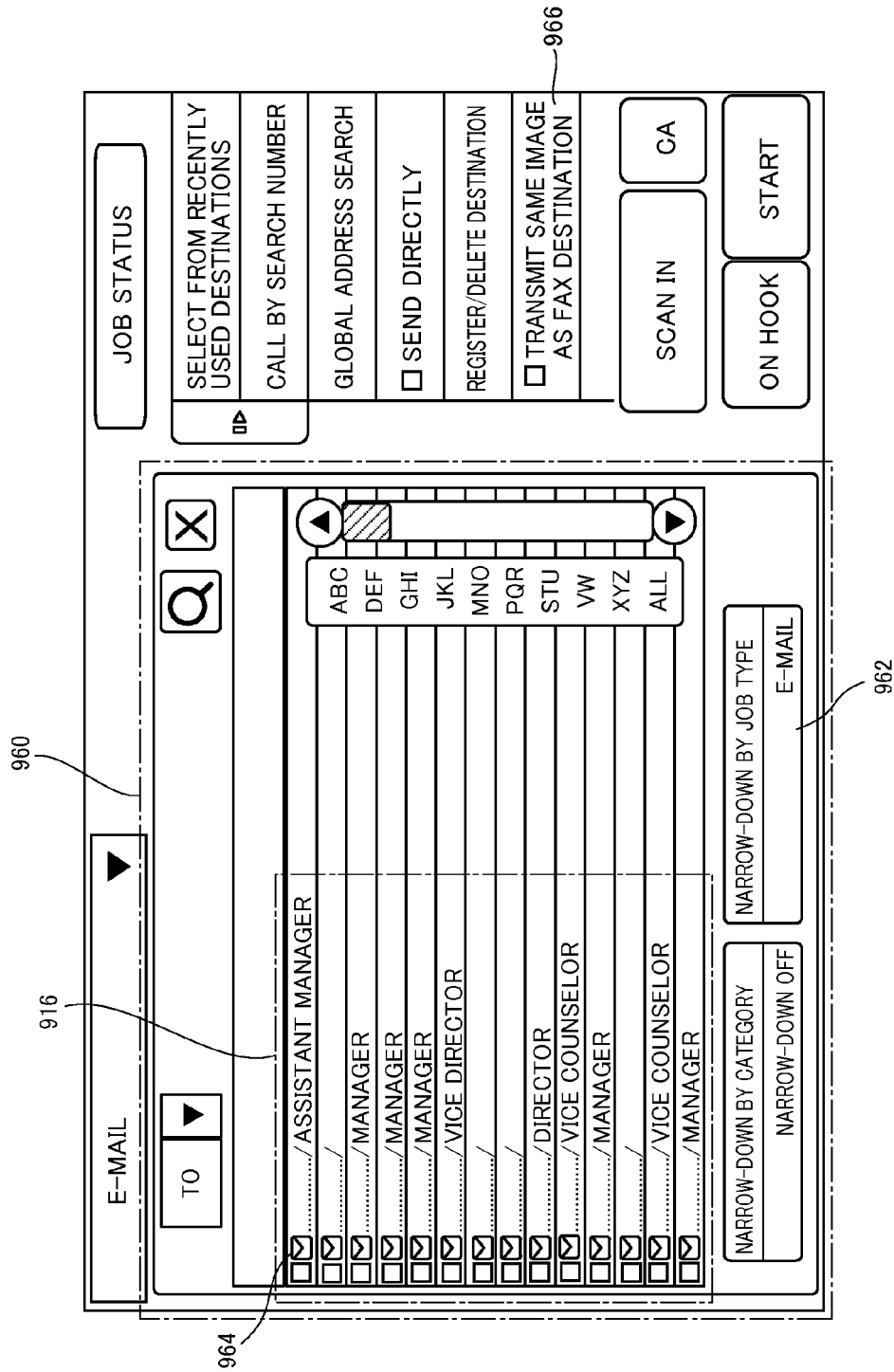
FIG. 4 shows a screen image corresponding to the screen image of FIG. 2 with the narrowing-down condition related to job type changed.
Figure 5:
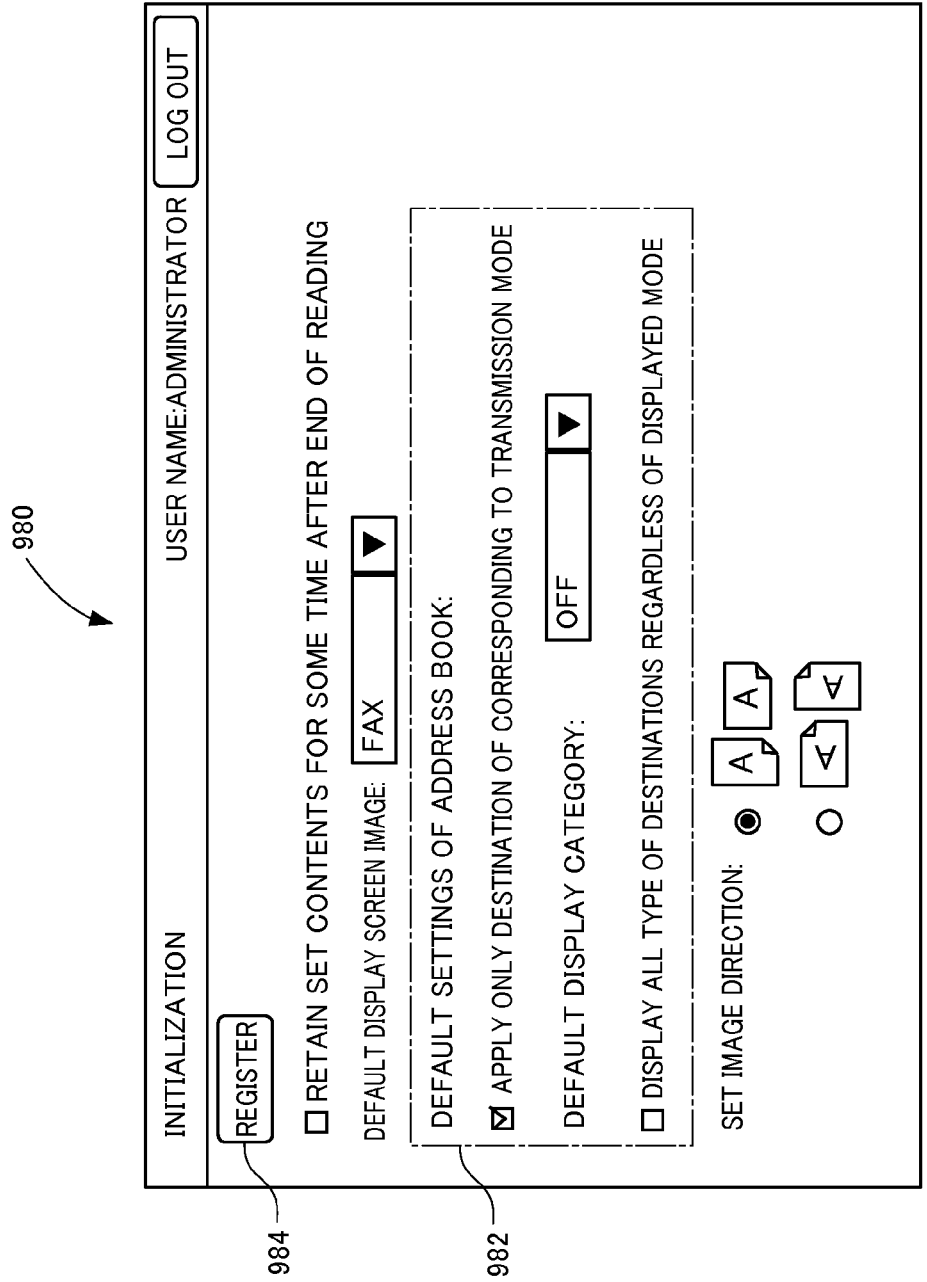
FIG. 5 shows a setting screen image of the image processing apparatus.

On action panel area 260 of basic screen image 300 of the facsimile mode, various execution keys for executing recommended functions of the facsimile mode are displayed. In FIG. 4, keys 262 to 270 are displayed. Key 262 is for selecting a transmission destination from among those used recently. Key 264 is for designating a search number (quick number registered in advance) and thereby calling destination information (facsimile number). Key 266 is for searching for a global address (facsimile number, mail address or the like) registered in an external server. Key 268 is for designating direct transmission. Key 270 is for registering or deleting a destination.

On task trigger area 280 of basic screen image 300 of the facsimile mode, a scan-in key 282, a clear-all key (CA key) 284, a start key 286 and an on-hook key 288 are displayed. Scan-in key 282 is for starting a scan-in process of scanning a facsimile document and displaying a preview image based on the scanned data on preview area 240. CA key 284 is for cancelling all parameters and functions of which settings have been changed, to return the settings to the default state. Start key 286 is for starting execution of facsimile transmission process. On-hook key 288 is for setting the line to an on-hook state.

In the following, referring to FIG. 12, a control structure of a program executed by CPU 102 for executing image transmission will be described. Assume that image processing apparatus 100 is powered on and home screen image 180 (see FIG. 8), for example, is displayed on operation unit 130.

Here, assume that the system settings of image processing apparatus are such that the narrowing-down function in the transmission mode is effectively set. Specifically, "APPLY ONLY DESTINATION CORRESPONDING TO TRANSMISSION MODE" is checked, and the basic screen image of the facsimile mode is set as the default display screen image. As described with reference to FIGS. 1 to 5, in image processing apparatus 100, when the address book is displayed, not all the recipient names of all transmission modes but only the recipient names corresponding to the designated (narrowed down) transmission mode are displayed on address book window 900. Further, when the user selects a specific recipient name from the listed recipient names and instructs transmission, transmission is done only to the transmission destination information of the designated transmission mode. Specifically, if the selected recipient name involves transmission destination information of a transmission mode that is not designated, the transmission destination information is not used at the time of transmission.

On the premise of the above, assume that the user touched right-feed key 188 on screen image 180 and thereafter, touched destination short-cut key 192 of address1 on the displayed screen image 190.

CPU 102 detects that destination short-cut key 192 is touched and, at step 400, determines whether or not selection of a transmission destination is to be done. Specifically, whether or not a display flag, which will be described later, has a prescribed value (for example, "0") is determined. If it is determined that the transmission destination is to be selected, the control proceeds to step 402. Otherwise (if selection of transmission destination is not to be done), the control proceeds to step 428.

At step 402, CPU 102 determines whether the transmission modes of destinations (transmission mode and transmission destination information) registered with the touched destination short-cut key 192 are all the same. If all transmission modes are determined to be the same, the control proceeds to step 406. Otherwise, the control proceeds to step 404.

At step 404, CPU 102 displays a basic screen image corresponding to the transmission mode set as the default on operation unit 130. Since the basic screen image for the facsimile mode is set as the default screen image here, basic screen image 300 for the facsimile mode is displayed.

At step 406, CPU 102 displays the basic screen image of the transmission mode registered with the destinations (the same transmission mode for all) on operation unit 130. By way of example, if the plurality of destinations have facsimile transmission registered as the transmission mode, basic screen image 300 of the facsimile mode is displayed. If the transmission mode of all destinations is electronic mail transmission, the basic screen image of the electronic mail transmission is displayed.

Figure 13:
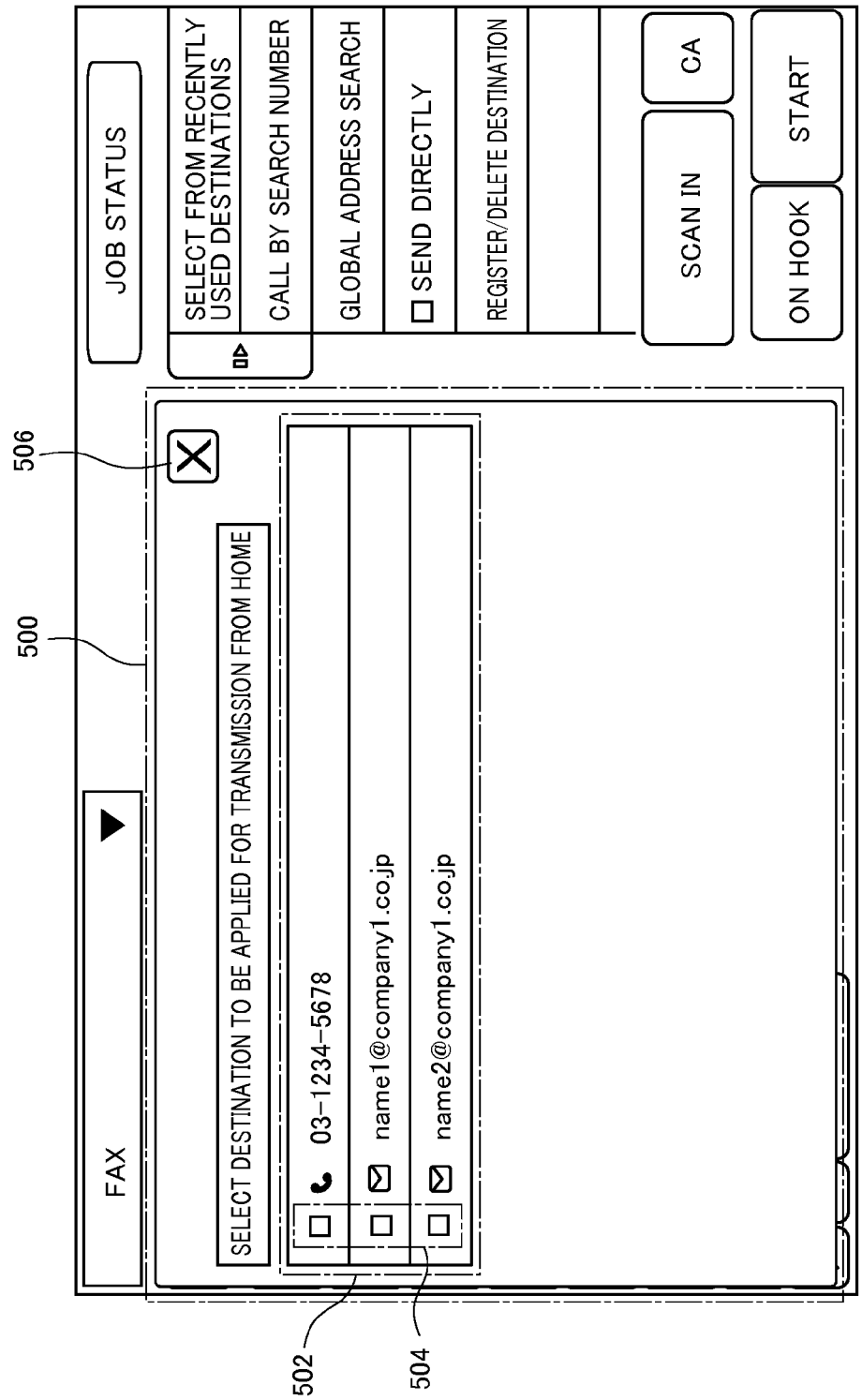
FIG. 13 shows a screen image having a transmission destination selection window displayed on the basic screen image.

At step 408, CPU 102 displays a window for selecting a transmission destination on the basic screen image that is being displayed. By way of example, a transmission destination selection window 500 shown in FIG. 13 is displayed. In FIG. 13, different transmission modes are displayed in transmission destination selection window 500 and, therefore, it can be understood that it is a screen image displayed at step 408 after the execution of step 404. On transmission destination display area 502, pieces of transmission destination information registered with the destination short-cut key stored in HDD 108 are displayed. In HDD 108, corresponding to the name "address1" of destination short-cut key, pieces of transmission destination information (facsimile number, mail address and the like) for image transmission are registered. On transmission destination selection window 500, as the pieces of transmission destination information registered for the destination short-cut key 192 having the name "address1," facsimile number "03-1234-5678" and mail addresses "name1@company1.co.jp" and "name2@company1.co.jp" are displayed. On transmission destination selection window 500, a message "SELECT DESTINATION TO BE APPLIED FOR TRANSMISSION FROM HOME" is displayed for the user. In FIG. 13, none of the check boxes 504 at the head of each line is checked and, hence, none of the pieces of transmission destination information is selected.

If the number of registrations with the destination short-cut key is large and not all can be displayed on transmission destination selection window 500, only a part of the contents is displayed and an up-key, a down-key, a slide bar and the like to allow display of further registered contents are also displayed. A key 506 is for erasing transmission destination selection window 500.

If step 406 is executed, on transmission destination selection window 500 displayed at step 408, different from FIG. 13, pieces of transmission destination information of only one transmission mode is displayed.

At step 410, CPU 102 determines whether or not any operation has been made on transmission destination selection window 500. Specifically, CPU 102 determines whether or not any of the check boxes 504 or key 506 is touched. If it is determined that any of these is touched, control proceeds to step 412. Otherwise, step 410 is repeated.

At step 412, CPU 102 determines whether or not the setting on transmission destination selection window 500 is established. Specifically, CPU 102 determines whether or not key 506 is touched. If it is determined to be established, the control proceeds to step 416. Otherwise, it proceeds to step 414.

At step 414, CPU 102 changes the setting of touched check box 504. If check box 504 is not checked, the screen image is changed to the checked state. If check box 504 is already checked, the screen image is changed to the unchecked state. Thereafter, the control returns to step 410.

At step 416, CPU 102 displays a screen image asking whether or not selection of transmission destination is to be done when destination short-cut key 192 is touched next time. Specifically, CPU 102 displays a confirmation window 600 shown in FIG. 14. On confirmation window 600, a message "DO YOU WANT DISPLAY OF TRANSMISSION DESTINATION SELECTION SCREEN IMAGE NEXT TIME?" for the user and keys 602 and 604 are displayed.

At step 418, CPU 102 determines whether key 602 or 604 is touched. If it is determined that either one of the keys is touched, the control proceeds to step 420. Otherwise, step 418 is repeated.

At step 420, CPU 102 determines whether or not key 602 is touched. If it is determined that key 602 is touched, the control proceeds to step 422. Otherwise, the control proceeds to step 424.

At step 422, CPU 102 erases confirmation window 600, sets the display flag indicating whether or not display of transmission destination selection window 500 is necessary to "1" (indicating that the window is to be displayed), determines the pieces of transmission destination information selected at steps 410 to 414 to be the transmission destinations, and temporarily stores the same in, for example, a prescribed area of RAM 106. Thereafter, the control proceeds to step 434.

At step 424, CPU 102 erases confirmation window 600, sets the display flag indicating whether or not display of transmission destination selection window 500 is necessary to "0" (indicating that the window is not to be displayed), determines the pieces of transmission destination information selected at steps 410 to 414 to be the transmission destinations, and temporarily stores the same in, for example, a prescribed area of RAM 106. Thereafter, the control proceeds to step 426.

Figure 14:
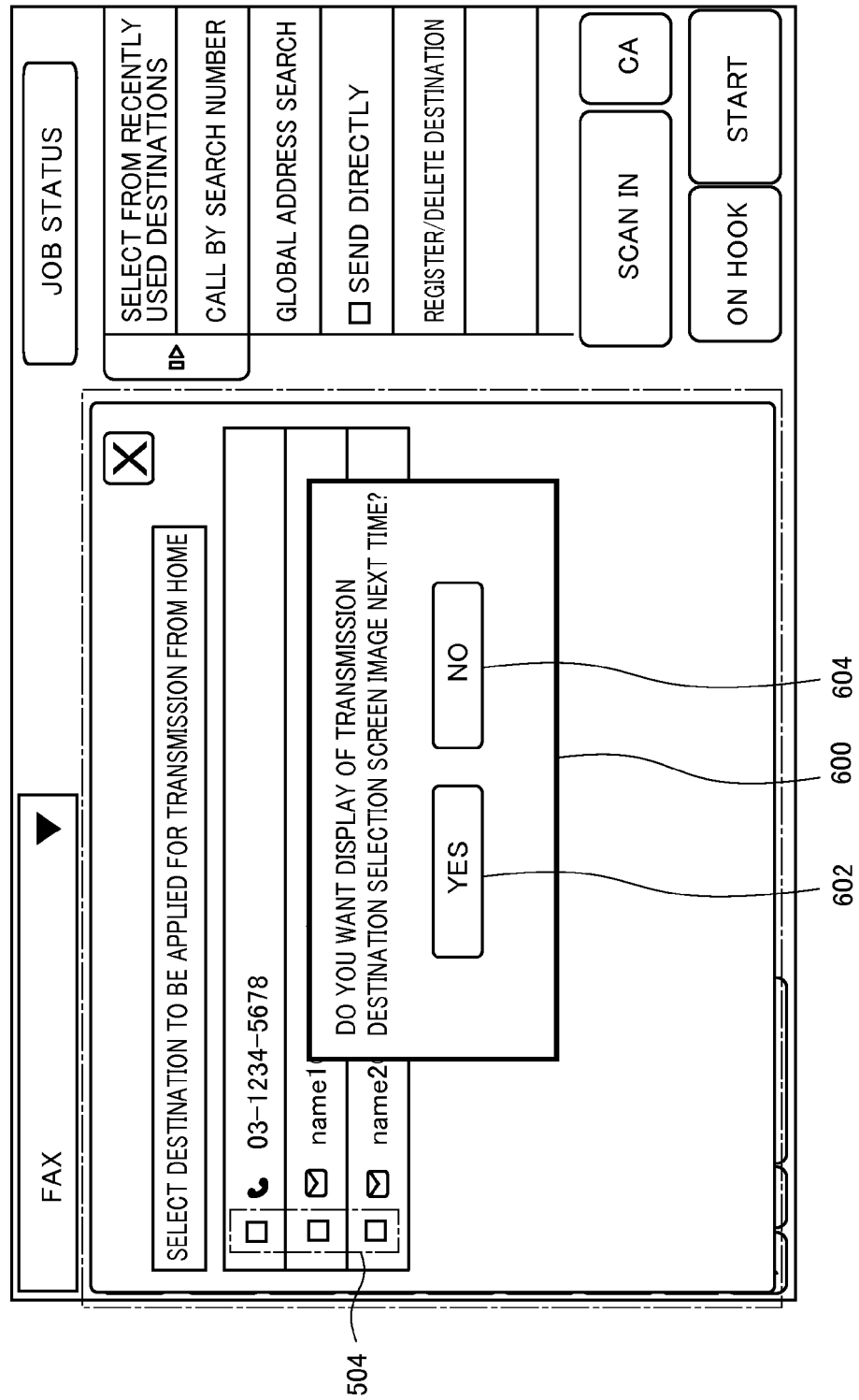
FIG. 14 shows a screen image having a confirmation window displayed on the transmission destination selection window.

At step 426, CPU 102 updates the registered information of destination short-cut key 192 with the set results of steps 410 to 414. Thereafter, the control proceeds to step 434. Specifically, in order to set the results of processes at steps 410 to 414, that is, the pieces of transmission destination information selected as transmission destinations, as the destinations to be used hereafter corresponding to the information specifying destination short-cut key 192, CPU 102 sets the corresponding selection flag to "1". If the check boxes are checked as shown in FIG. 14, the pieces of information stored in correspondence with the information "addresss1" specifying destination short-cut key 192 are as shown in Table 2.

TABLE 2

| Transmission mode | Transmission destination information | Selection flag |
|---|---|---|
| Fax | 03-1234-5678 | 1 |
| E-mail | name1@company1.co.jp | 0 |
| E-mail | name2@company1.co.jp | 1 |

If it is determined at step 400 that selection of transmission destination is not to be done, at step 428, CPU 102 determines whether or not the destinations to be used (with selection flag of "1") among the destinations registered with the touched destination short-cut key 192 (transmission mode and transmission destination information) all have the same transmission mode. If it is determined that they all have the same transmission mode, the control proceeds to step 430. Otherwise, the control proceeds to step 404, and the basic screen image corresponding to the transmission mode set as the default mode is displayed on operation unit 130. Then, the control proceeds to step 432.

At step 430, CPU 102 displays the basic screen image of the transmission mode of the destinations to be used (all have the same transmission mode). By way of example, if the destinations to be used all have facsimile transmission as the transmission mode, basic screen image 300 of the facsimile mode is displayed. If the destinations to be used all have electronic mail transmission as the transmission mode, the basic screen image of the electronic mail transmission mode is displayed.

At step 432, CPU 102 determines the transmission destination information of the destinations to be used as the transmission destination, and temporarily stores the same in a prescribed area of, for example, RAM 106. Thereafter, the control proceeds to step 434.

At step 434, CPU 102 displays the basic screen image on operation unit 130. At this time, pieces of transmission destination information determined at step 422, 424 or 432 are displayed as a list, not to hide at least the task trigger area 280, on the basic screen image.

At step 436, CPU 102 determines whether or not any operation is done on the basic screen image. Specifically, CPU 102 determines whether or not any key on the basic screen image is touched. If it is determined that an operation is done, the control proceeds to step 438. Otherwise, step 436 is repeated.

At step 438, CPU 102 determines whether or not the start key instructing transmission (in FIG. 11, start key 286) is touched. If it is determined that the start key is touched, the control proceeds to step 442. Otherwise, the control proceeds to step 440.

At step 440, CPU 102 determines whether or not a cancel key (in FIG. 11, CA key 284) for cancelling transmission is touched. If it is determined that the cancel key is touched, operations made by that time are cancelled and the program is terminated. Otherwise (if a key other than the start key and the cancel key is touched), CPU 102 executes a process corresponding to the touched key. Thereafter, the control returns to step 434. By way of example, at step 434, when the pieces of transmission destination information are to be displayed in a list, a "delete" key may be displayed to allow deletion of a piece of transmission destination information displayed in the list. In that case, if a specific piece of transmission destination information is touched and the delete key is pressed, the touched piece of transmission destination information is deleted from the transmission destinations and also deleted from the transmission destination list on the basic screen image.

At step 442, CPU 102 produces image data for transmission, and transmits the produced image data to the determined transmission destinations. Then, the program ends. Specifically, CPU 102 scans the document by controlling document reading unit 110, stores the document as image data, and produces and transmits image data in accordance with the transmission mode. By way of example, it produces image data for facsimile transmission in accordance with conditions of facsimile transmission (color or monotone, resolution and the like).

When the program ends, operation unit 130 returns to the state having home screen image 180 displayed thereon.

By the above-described approach, in connection with the setting of address book display and setting of the transmission destination using the address book, if image processing apparatus 100 is set to apply only the destinations corresponding to the mode of transmission, it is possible for the user to transmit after selecting the transmission destination or destinations, after touching the destination short-cut key. Automatic transmission to the transmission destinations registered for the destination short-cut key does not take place when the destination short-cut key is touched. Therefore, transmission to a destination not intended by the user can be prevented, and the user can use the destination short-cut key with ease.

When the user touches a specific destination short-cut key and once determines the transmission destination or destinations, it is possible to use the thus determined transmission destinations directly if the same destination short-cut key is touched next time. Thus, more efficient transmission is possible.

Further, even when the user touches a specific destination short-cut key and once determines the transmission destination or destinations, it is possible to set transmission destinations again if the same destination short-cut key is touched next time. This makes use of the destination short-cut key safer and easier.

In connection with the display of an address book and setting of the transmission destination using the address book, if image processing apparatus 100 is not set to apply only the destinations corresponding to the mode of transmission and the user touches the destination short-cut key, automatic transmission to the transmission destinations registered for the destination short-cut key takes place in the similar manner as in the conventional example.

Figure 12:
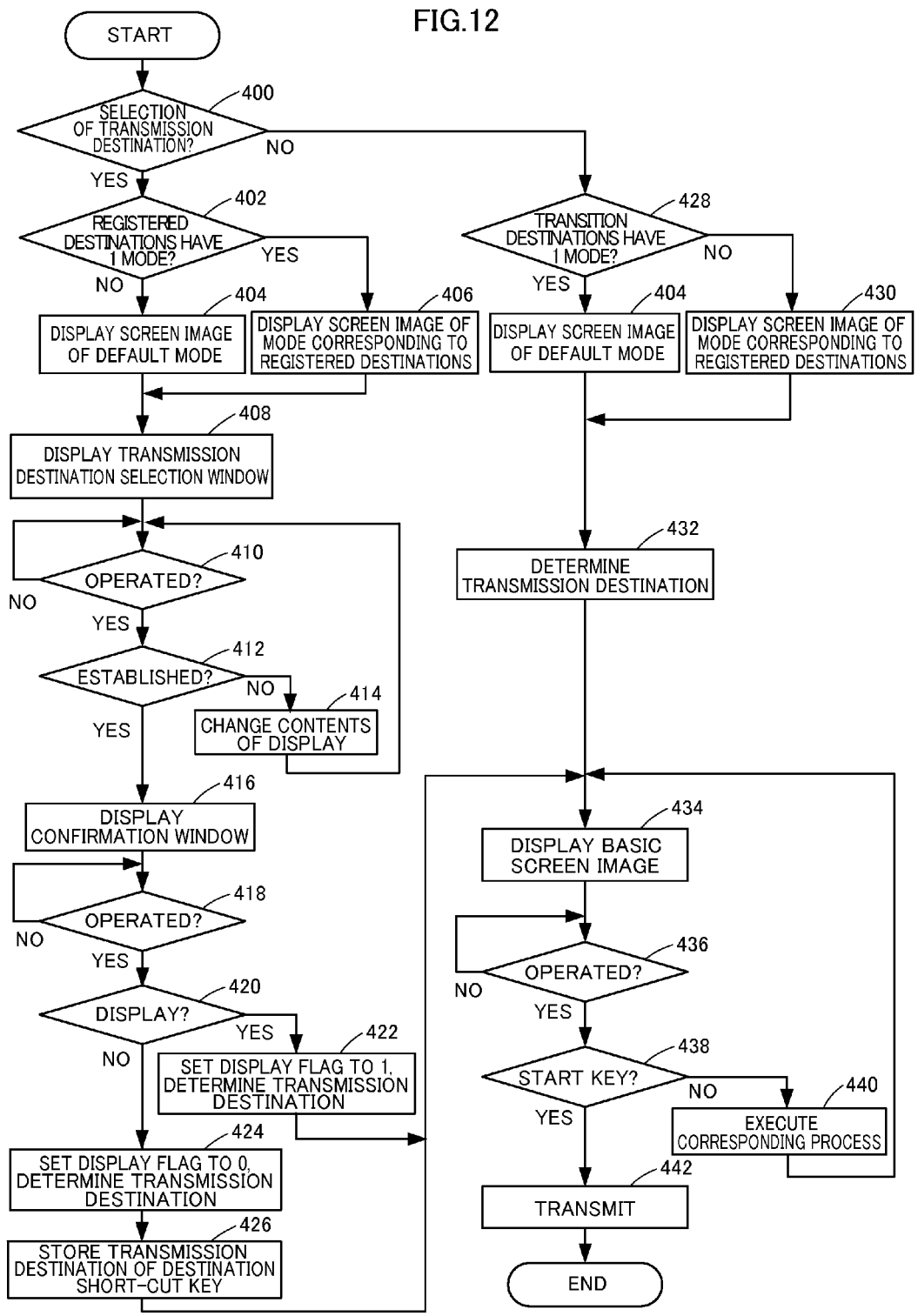
FIG. 12 is a flowchart representing a control structure of a computer program executing image transmission.
Figure 15:
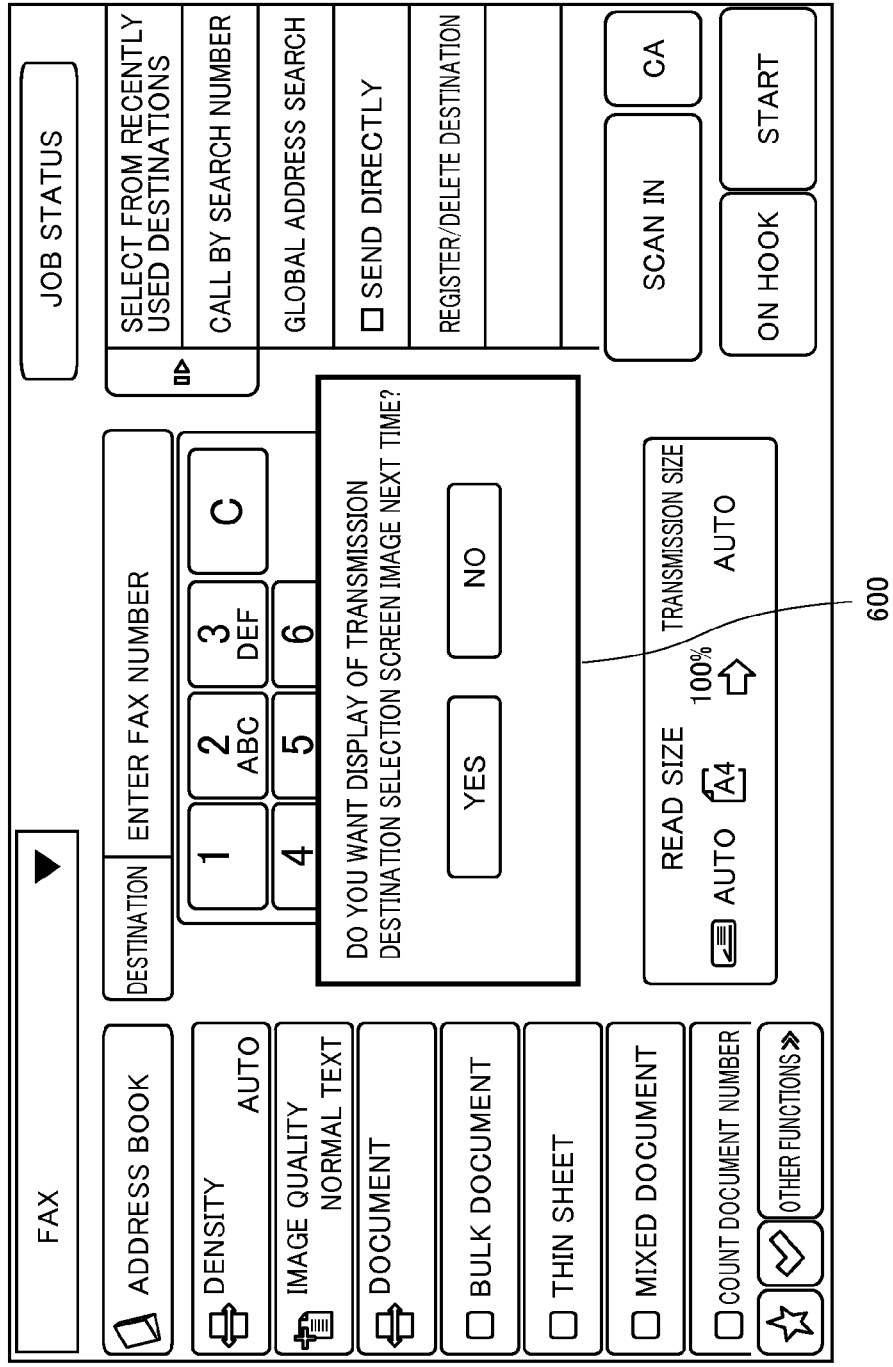
FIG. 15 shows a screen image having a confirmation window displayed on the basic screen image.

The flowchart shown in FIG. 12 may be executed with various modifications. For instance, after the transmission destinations are determined at step 432, the control proceeds to step 434 in the flow described above. The operation, however, is not limited to the above. Before or after step 432, confirmation window 600 may be displayed as shown in FIG. 15. Specifically, even when already determined transmission destinations are used without displaying transmission destination selection window 500 (when step 428 is executed as a result of determination at step 400), transmission destination selection window 500 may be displayed the next time. This provides the user with more flexible manner of use of the destination short-cut key.

In the forgoing, an example in which the narrowing-down function of the transmission mode is ON (valid) has been described. This example, however, is not limiting. Even when the narrowing-down function in the transmission mode is OFF, it may be possible to allow the user to select a transmission destination by displaying the transmission destination selection window. Further, in an image processing apparatus not having the narrowing-down function in the transmission mode, it may be possible to allow the user to select a transmission destination by displaying the transmission destination selection window when the destination short-cut key is touched.

In the foregoing, an example in which information specifying the transmission mode (type of image transmission) is registered with a short-cut key in correspondence with the transmission destination information has been described. The example, however, is not limiting. The information specifying the transmission mode may not be registered with the short-cut key. The transmission destination information differs depending on the transmission mode. By way of example, a facsimile number is a series of numerals of a prescribed number of digits, and an electronic mail address has "@" therein. Therefore, it is possible to specify the corresponding transmission mode and, therefore, the information for specifying the transmission mode need not be registered with the destination short-cut key.

Though it is possible to select and register the destination short cut key from the address book, it is preferable to store the short-cut key separately from the information of the address book. Specifically, it is desirable to have the transmission destination information registered with the destination short-cut key inaccessible from the common menu (such as searching through the address book).

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image processing apparatus, comprising:
a storage unit storing a plurality of pieces of transmission destination information representing transmission destinations of image transmission in correspondence with a short-cut key icon for instructing image transmission;
a display unit displaying said short-cut key icon;
an operation unit detecting selection of said short-cut key icon; and
a control unit causing, if selection of said short-cut key icon is detected by said operation unit and a prescribed condition is satisfied, said display unit to simultaneously display said plurality of pieces of transmission destination information stored in correspondence with selected said short-cut key icon; wherein
said operation unit receives a selection operation for selecting at least one piece of transmission destination information from said plurality of pieces of transmission destination information simultaneously displayed on said display unit;
said control unit determines said selected piece of transmission destination information as a transmission destination of image transmission made by the selection of said short-cut key icon;
after completion of said selection operation, said control unit causes said display unit to display a screen image including a message confirming whether said selection operation is to be done if said short-cut key icon is selected next time;
when said operation unit receives information of necessity of selection as an instruction as to whether said selection operation is to be done or not, said control unit stores data indicating said necessity of selection in correspondence with said short-cut key icon in said storage unit;
said prescribed condition is satisfied if the information of said necessity of selection is an instruction to execute said selection operation;
if an instruction not to execute said selection operation is received by said operation unit, said control unit stores selection information for determining said transmission destination information selected to be a transmission destination of image transmission when said short-cut key icon is selected, in said storage unit in correspondence with said short-cut key icon; and if selection of a short-cut key icon is detected by said operation unit and said data indicating said necessity of selection corresponding to the selected short-cut key icon is data not to execute said selection, said control unit determines a transmission destination of image transmission made by the selection of said short-cut key icon, from among a plurality of pieces of transmission destination information corresponding to said short-cut key icon, in accordance with said selection information corresponding to said short-cut key icon.

2. The image processing apparatus according to claim 1, wherein said storage unit stores the transmission destination information to transmit image data as an address book in correspondence with recipient names; and said short-cut key icon is stored separately from said address book.

* * * * *